United States Patent [19]
Larkin

[11] Patent Number: 5,730,678
[45] Date of Patent: Mar. 24, 1998

[54] MULTI-RANGE, HYDROMECHANICAL TRANSMISSION FOR MOTOR VEHICLES

[76] Inventor: Robert Francis Larkin, 51 Broad St., Pittsfield, Mass. 01201

[21] Appl. No.: 608,389

[22] Filed: Feb. 28, 1996

[51] Int. Cl.⁶ .................................................. F16H 47/04
[52] U.S. Cl. ............................................................ 475/81
[58] Field of Search ....................................... 475/79, 81

[56] References Cited

U.S. PATENT DOCUMENTS

| | | |
|---|---|---|
| 3,433,095 | 3/1969 | Tuck ............................ 475/81 |
| 3,572,164 | 3/1971 | Smith ........................... 475/81 |
| 3,714,845 | 2/1973 | Mooney, Jr. ................... 475/81 |
| 3,777,593 | 12/1973 | Mooney, Jr. et al. .......... 475/81 |
| 3,979,972 | 9/1976 | Sakai et al. ................... 475/81 |
| 4,754,664 | 7/1988 | Dick . |
| 4,803,897 | 2/1989 | Reed . |
| 4,817,460 | 4/1989 | Reed . |
| 4,997,412 | 3/1991 | Reed . |
| 5,030,177 | 7/1991 | Reed . |

OTHER PUBLICATIONS

SAE Technical Paper Series No. 941722, by Hiroyuki Mitsuya et al., "Development of Hydromechanical Transmission (HMT) for Bulldozers", pp. 1–10, SAE910958 (1991). Society of Automotive Engineers, Inc., Howard L. Benford et al., "The Lever Analogy—A New Tool in Transmission Analysis", pp. 1–8.

Primary Examiner—Dirk Wright
Attorney, Agent, or Firm—Robert A. Cahill

[57] ABSTRACT

A hydromechanical transmission receives split power inputs from a vehicle engine, one split input driving a hydrostatic power unit and the other split input driving a mechanical power input. The infinitely variable hydrostatic power output is combined in the mechanical power unit with multiple ratios of its split input power to achieve multiple ratios of hydromechanical output power for smoothly propelling a vehicle from rest through multiple transmission ranges to maximum speed, with synchronous shifting between ranges.

23 Claims, 9 Drawing Sheets

| RANGE | B1 | B2 | B3 | CL1 | CL2 | CL3 | HSP STROKE | SPEED RATIO Vin : Vout |
|---|---|---|---|---|---|---|---|---|
| FIRST | X | | | | | | 0% → 95% | 1:0 → 1:0.275 |
| SECOND | | X | | | | | 9% ← 95% | 1:0.275 → 1:0.5 |
| THIRD | | | | X | | | 9% → 95% | 1:0.5 → 1:0.75 |
| FOURTH | | | | | X | | 9% ← 95% | 1:0.75 → 1:1 |
| FIFTH | | | | | | X | 9% → 100% | 1:1 → 1:1.25 |
| REVERSE | | | X | | | | 0% → 100% | 1:0 → 1:0.27 |

FIG. 3

| RANGE | B4 | B5 | B6 | B7 | CL4 | CL5 | HSP STROKE | SPEED RATIO Vin : Vout |
|---|---|---|---|---|---|---|---|---|
| 1st FORWARD | | | | X | | X | 0% → 95% | 1:0 → 1:0.33 |
| 2nd FORWARD | | X | | | | X | 0% ← 95% | 1:0.33 → 1:0.7 |
| 3rd FORWARD | | | | | X | X | 0% → 100% | 1:0.7 → 1:1 |
| 1st REVERSE | X | | X | | | | 0% → 95% | 1:0 → 1:0.35 |
| 2nd REVERSE | X | | | | X | | 0% ← 95% | 1:0.35 → 1:0.7 |
| 3rd REVERSE | X | X | | | | | 0% → 100% | 1:0.7 → 1:1 |

FIG. 10

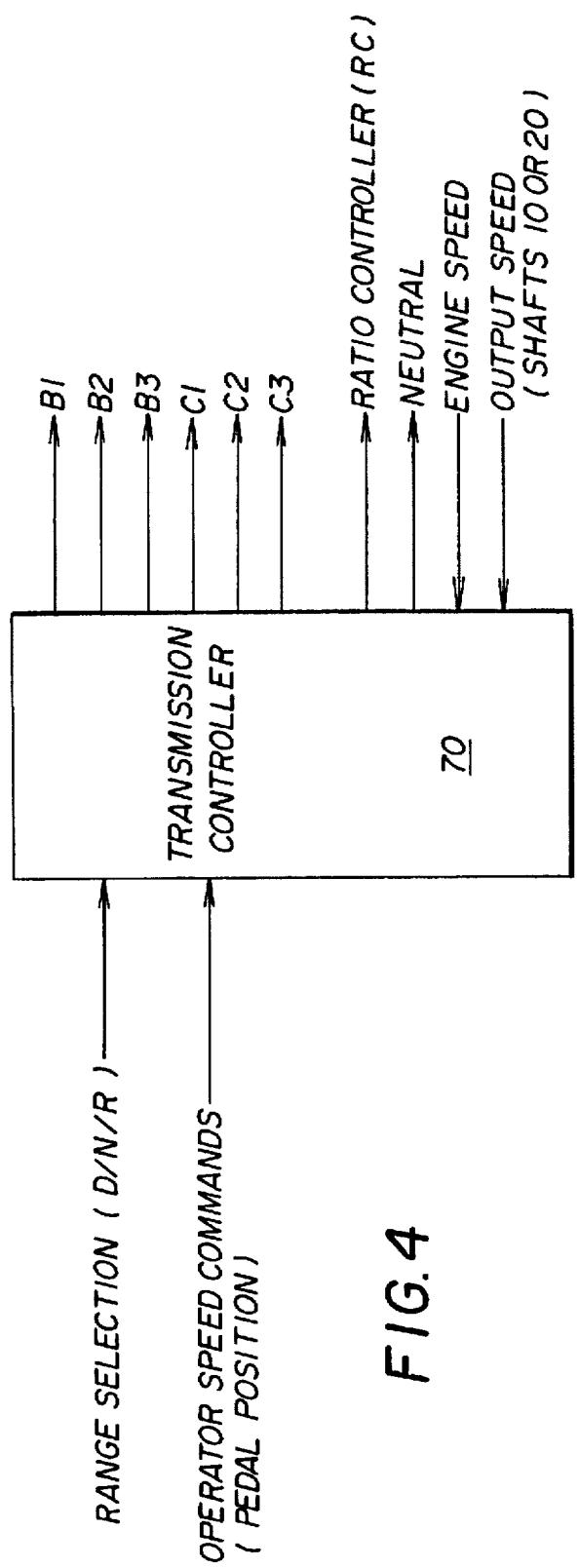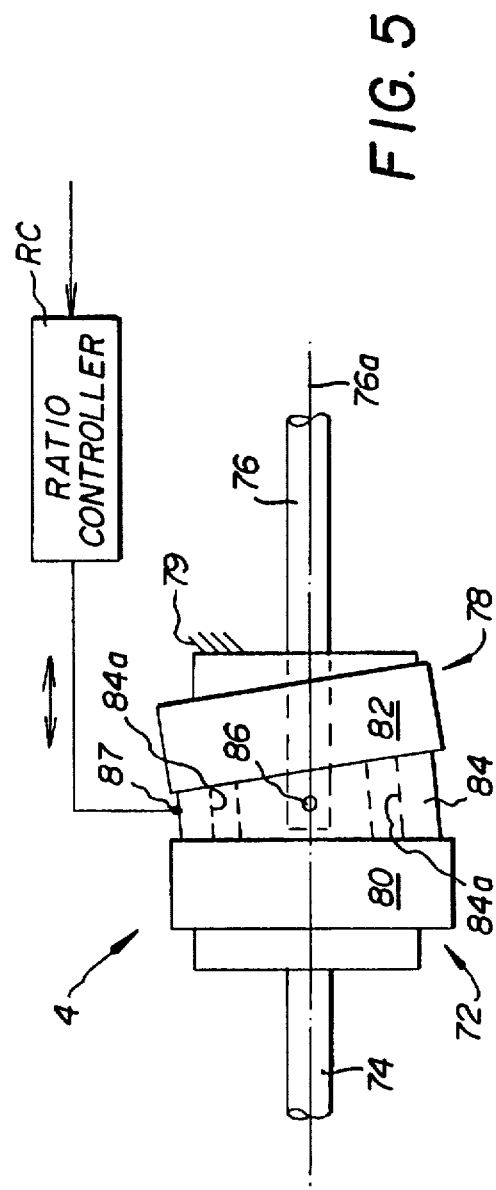
FIG. 4
FIG. 5

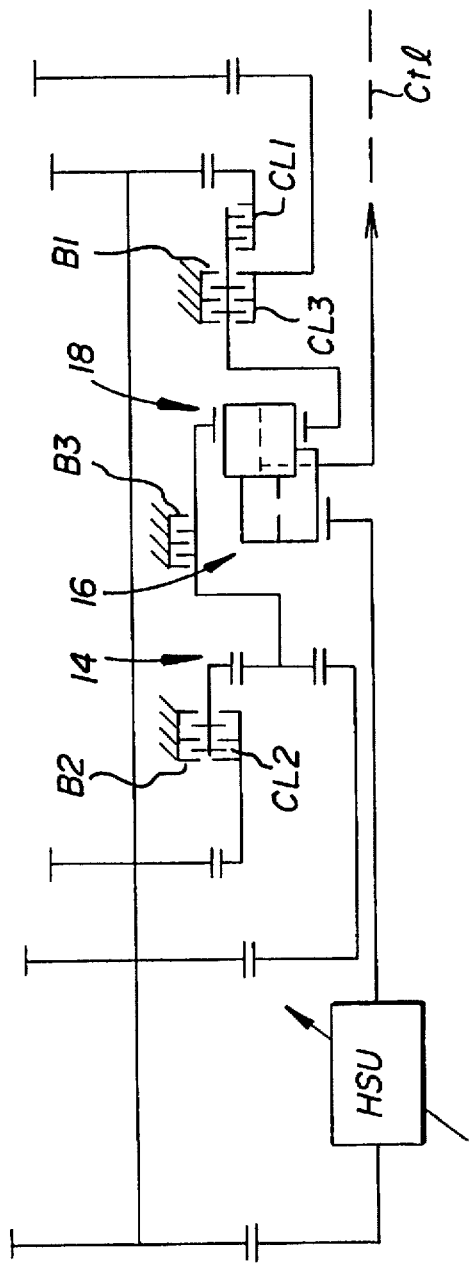
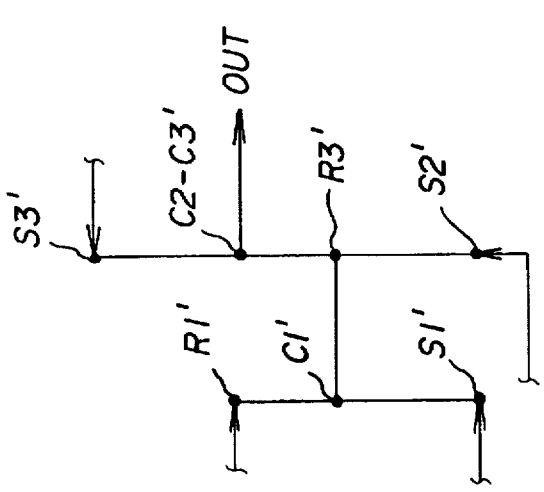
FIG. 7A
FIG. 7B

MULTI-RANGE, HYDROMECHANICAL TRANSMISSION FOR MOTOR VEHICLES

FIELD OF THE INVENTION

The present invention relates to hydromechanical transmissions and particularly to multi-range hydromechanical transmissions applicable for inclusion in drivetrains for on-road vehicles.

BACKGROUND OF THE INVENTION

Innumerable designs of transmissions for cars and light commercial vehicles have been proposed over the years that utilize hydraulic transmissions for multiplying engine torque to accelerate a vehicle from rest and then restore or preferably increase output speed potential. However, such design efforts have typically resulted in hydraulic transmissions that, although of acceptable torque capacity, are undesirably large and heavy. Moreover, such transmissions have exhibited less than optimum efficiency, and thus fuel economy and/or performance suffer.

As an alternative to the purely hydraulic transmissions, referred to above, hydromechanical transmissions have been utilized in drivetrains for large off-road construction and military vehicles. Such transmissions are typically of a split power input type, wherein a hydrostatic power unit and a mechanical power unit are driven in parallel by the vehicle engine. The hydrostatic power unit converts its split mechanical input power from the engine into hydrostatic output power that can be infinitely varied in speed and torque over a particular hydrostatic stroke range. This hydrostatic output power is combined in the mechanical power unit with its split mechanical input power from the engine to produce hydromechanical output power in multiple power ranges. The speed and torque in each of the power ranges initially set by gear ratios of the mechanical power unit can be infinitely varied by varying the stroke of the hydrostatic power unit.

A properly designed hydromechanical transmission can advantageously provide synchronous range shifting that affords smooth and uninterrupted power flow from engine to driving wheel(s), as the vehicle is accelerated from rest to maximum speed. An additional benefit is that the engine may be operated at or near its peak efficiency output speed, regardless of transmission output speed. However, to achieve the performance required of on-road vehicles in terms of acceleration, speed and fuel economy, the mechanical power unit has traditionally required far too many geartrains, such as spur and pinion gear sets and planetary gear sets. Thus, such hydromechanical transmissions suffer the same drawbacks as their counterpart hydraulic transmissions in terms of size, weight, efficiency, etc.

SUMMARY OF THE INVENTION

The objective of the invention is to overcome the drawbacks of known hydraulic transmissions, including those noted above, by providing a vehicular multi-range hydromechanical transmission that includes a transmission controller for receiving operator speed commands, and a hydrostatic power unit having a first mechanical input for driving connection to a prime mover and a unidirectional hydrostatic output. The hydrostatic power unit is operatively connected for control by the transmission controller to provide an infinitely variable transmission ratio between a speed of the first mechanical input and a speed of the hydrostatic output over a continuous range of 1:0 to 1:1. A mechanical power unit, having a second mechanical input for driving connection to the prime mover and a transmission output for connection to a load, is also included.

The mechanical power unit includes a first planetary gear set having a first gear element connected to the second mechanical input at a first gear ratio, and second and third gear elements; a combining gear mechanism including second and third interconnected planetary gear sets having a fourth gear element connected to the third gear element of the first planetary get set, a fifth gear element connected to the hydrostatic output, a sixth gear element connectable to the second mechanical input at a second gear ratio, and a seventh gear element connected as the transmission output.

The hydromechanical transmission of the invention further includes range shifting means actuated by the transmission controller in response to the operator input speed command for braking and/or clutching selected gear elements of the first, second, and third planetary gear sets to produce an infinitely variable output speed at the transmission output within each of at least one reverse range and at least first, second, and third forward ranges.

Additional objectives and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 3 is a table indicating which of the multiple brakes and clutches in the transmission embodiment of FIG. 1A are engaged in each of the transmission ranges, together with exemplary operating parameters for each transmission range;

FIG. 4 is a block diagram of a transmission controller that may be utilized to operate the transmission embodiment of FIG. 1A through its multiple transmission ranges;

FIG. 5 is a generalized side view of a hydrostatic power unit that may be utilized in the transmission embodiment of FIG. 1A;

FIGS. 6A, 6B, 7A and 7B are schematic diagrams of alternative hydromechanical transmission embodiments of the present invention;

FIG. 10 is a table indicating which of the multiple brakes and clutches in the transmission embodiments of FIGS. 8 and 9 are engaged in each of the transmission ranges, together with exemplary operating parameters for each transmission range.

Like reference numerals refer to like parts throughout the several view of the drawings.

DETAILED DESCRIPTION OF THE PREFERRED EMBODIMENTS

A multi-range hydromechanical transmission in accordance with the present invention includes a split input for dividing the power output of a prime mover between a hydrostatic power unit and a mechanical power unit. The hydrostatic power unit is operable to convert split input power to hydrostatic output power over a continuously variable speed ratio ranging from 1:0 to 1:1. The mechanical power unit combines split input power with the hydrostatic output power from the hydrostatic power unit to provide hydromechanical output power for application to a load, such as one or more driving wheels of a vehicle.

Further, the mechanical power unit of the invention is capable of shifting the split input power between multiple power flow paths that include unique combinations of mechanical gear sets for a corresponding multiple of mechanical power outputs at different ratios of torque and speed. The mechanical power unit then individually combines each of the mechanical outputs with the hydrostatic power unit output to produce hydromechanical output power at multiple ranges of speed and torque. Within each range, an infinitely variable power ratio is achieved by varying the hydrostatic power unit ratio between 1:0 and 1:1.

Figure 1A:
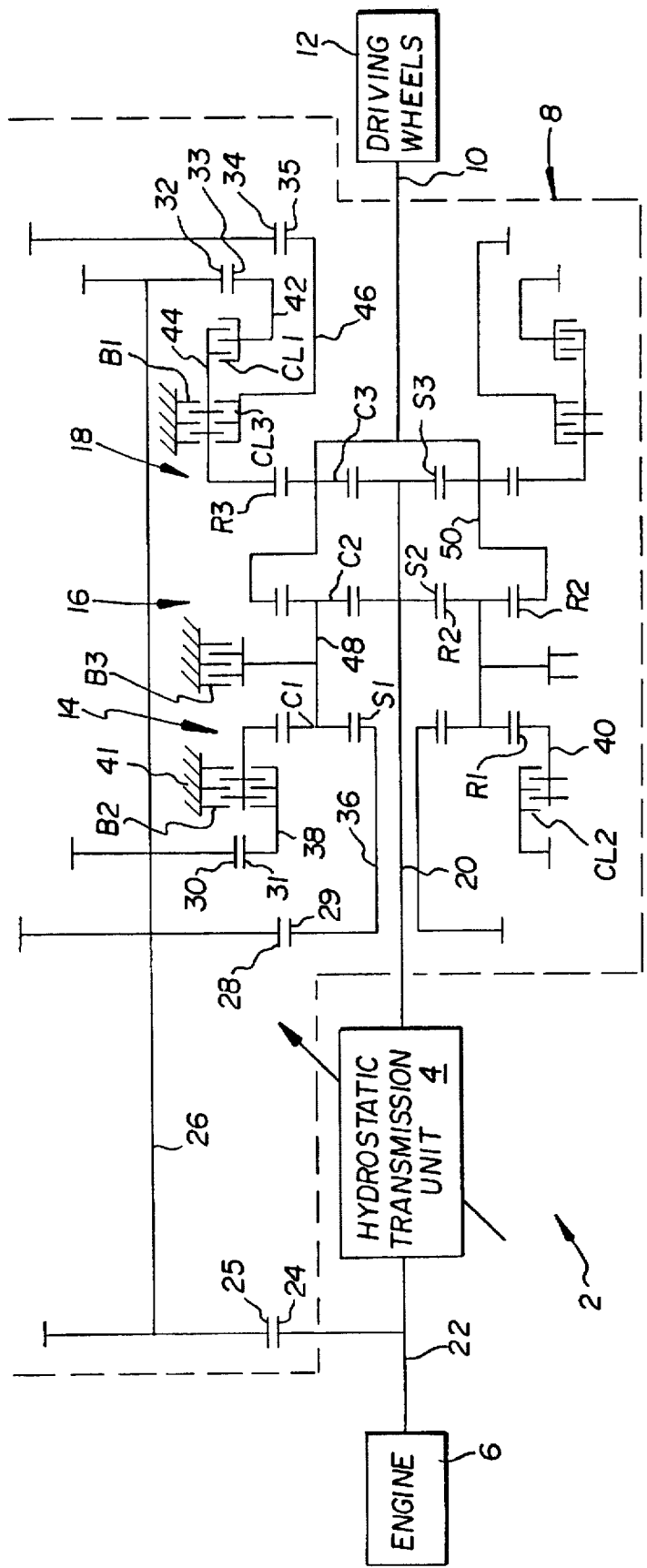
FIG. 1A is a schematic diagram of a hydromechanical transmission structured in accordance with one embodiment of the present invention.
Figure 1B:
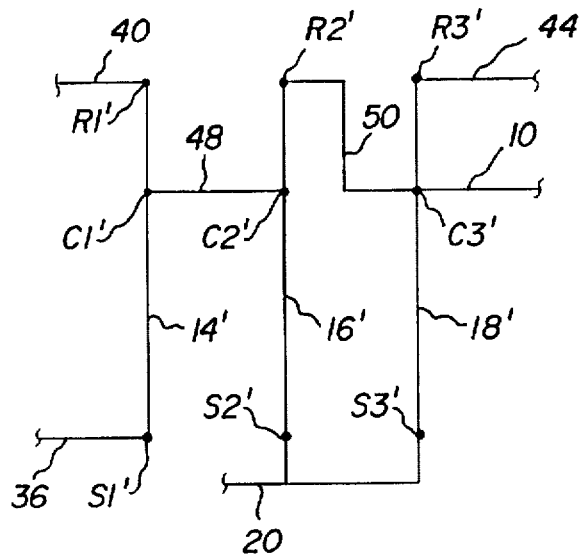
FIGS. 1B and 1C are Lever Analogy diagrams representing the three planetary gear sets in the transmission embodiment of FIG. 1A.
Figure 1C:
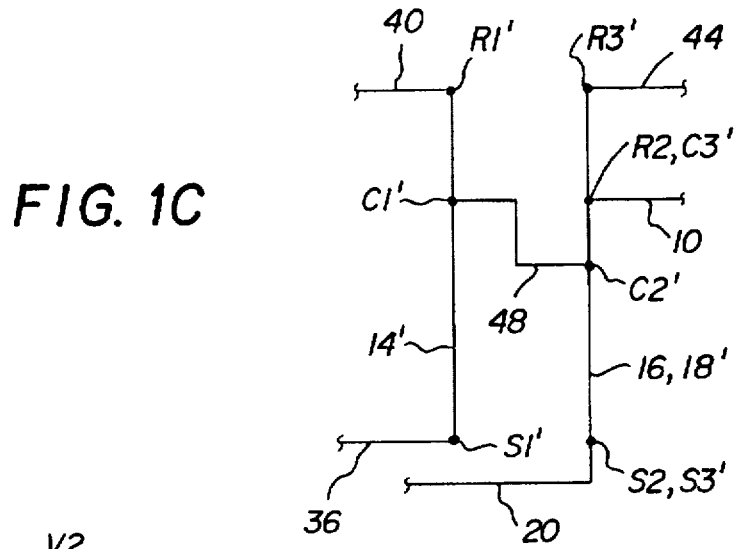

Turning to the schematic diagram of FIG. 1, illustrating a first embodiment of the present invention, a multi-range hydromechanical transmission, generally indicated at 2, includes an input shaft 22 for receiving input power from a prime mover, such as a internal combustion engine 6. This input power is split between a hydrostatic power unit 4 and a countershaft 26, included in a mechanical power unit, generally indicated at 8. As illustrated by way of example in FIG. 1, hydrostatic power unit 4 receives its split input from engine 6 directly from input shaft 22, while mechanical power unit 8 receives its split input via a spur gear 24 driven by input shaft 22, which meshes with a spur gear 25 fixed on the left end of countershaft 26. Driven off this countershaft are a set four spur gears 28, 30, 32, and 34. Spur gear 28 meshes with a spur gear 29 carried by a sleeve shaft 36, which is connected to drive a sun gear S1 of an input planetary gear set 14. Spur gear 30 meshes with a spur gear 31 carried on a sleeve shaft 38, which is selectively coupled by a clutch CL2 to a sleeve shaft 40 connected to ring gear R1 of input planetary gear set 14. A brake B2 is provided to connect sleeve shaft 40 to the transmission housing, indicated at 41, and thus brake this sleeve shaft and ring gear R1 against rotary motion. In this case, ring gear R1 is said to be "grounded".

Still referring to FIG. 1, countershaft spur gear 32 meshes with spur gear 33 carried on a sleeve shaft 42, which is selectively coupled to a sleeve shaft 44 by a clutch CL1. The split power input of the engine on countershaft 26 is also applied to spur gear 34, which meshes with a spur gear 35 carried on a sleeve shaft 46. A clutch CL3 selectively couples sleeve shaft 46 to sleeve shaft 44, that is connected to ring gear R3 of planetary gear set 18. A brake B1 selectively arrests rotary motion of sleeve shaft 44 to ground ring gear R3.

The infinitely variable speed hydrostatic output of hydrostatic power unit 4 on output shaft 20 is applied jointly to a sun gear S2 of planetary gear set 16 and to sun gear S3 of planetary gear set 18. Completing the description of transmission 2, planetary gear carriers C1 and C2 of planetary gear sets 14 and 16 are interconnected by a sleeve shaft 48, which is selectively braked by a brake B3 to ground carriers C1 and C2 to transmission housing 41. Ring gear R2 of planetary gear set 16 is connected to a planetary gear carrier C3 of planetary gear set 18 by a sleeve shaft 50 that is also connected to a transmission output shaft 10.

As will be seen from the description to follow, the split power input of engine 6, ratioed by spur gears 24 and 25, is tapped from the countershaft 26 at various magnitudes of speed and torque determined by the ratios of the meshing spur gear sets 28–29, 30–31, 32–33, and 34–35 to establish five forward ranges and one reverse range of operation for transmission 2, depending upon selective engagements of the various brakes and clutches. More specifically, in all ranges, the split mechanical input power on countershaft 26 is applied through meshing spur gears 28, 29 to sun gear S1 of planetary gear set 14. However, only in second and fourth forward ranges is this power input involved in a power flow path through mechanical power unit 8 to output shaft 10. When transmission 2 is operated in the third forward range, mechanical input power on countershaft 26 flows through a path including meshing spur gears 32, 33 and planetary gear sets 16, 18 to output shaft 10, while countershaft input power flows through a path including spur gears sets 28–29, 30–31 and the three planetary gear sets to the output shaft in fourth range. Fifth range input power (speed and torque) flows through a path from countershaft 26 via meshing spur gears 34, 35 and planetary gear sets 16, 18 to the output shaft.

While second through fifth ranges are hydromechanical ranges, first forward range is purely a hydrostatic range, and thus transmission output power is supplied solely by hydrostatic power unit 4 at infinitely variable torque and speed. Within each of the four higher forward speed ranges, the infinitely variable hydrostatic output power supplied by hydrostatic power unit 4 is combined with the mechanical input power tapped from countershaft 26 and flowing in the above-noted paths to achieve infinitely variable output power (speed and torque) in each of the second through fifth ranges. As will be seen, transmission 2 also has the capability of operating in an infinitely variable speed reverse range comparable in power to the first forward range, with input power supplied solely by hydrostatic power unit 4.

To facilitate an explanation of the operation of transmission 2, the following description takes advantage of the analysis technique described in the article "Lever Analogy—A New Tool In Transmission Analysis," by Benford et al., Society of Automotive Engineers, Pub. No. 810102 (1981). According to this technique, a planetary gear set, at rest, can be analogized by a vertical line (lever), with its sun gear, ring gear, and planet gear carrier represented as points on this line, that are relatively positioned in accordance with the numbers of sun gear and ring gear teeth, i.e., gear ratio.

FIG. 1B is a graphical representation of the three planetary gear sets 14, 16, and 18 of FIG. 1A as three vertical levers 14', 16', and 18', respectively, in accordance with this Lever Analogy technique. Also represented in FIG. 1B are the interconnections between gear elements of the planetary gear sets 14, 16, and 18 provided by sleeve shafts 48 and 50, as well as the various countershaft power inputs on sleeve shafts 36, 40, 44, the hydrostatic input on shaft 20, and the output on transmission output shaft 10. FIG. 1B illustrates that, according to this Lever Analogy, the interconnections between planetary gear sets 14, 16, and 18 permit the graphical representation of these three planetary gear sets to be simplified by combining planetary gear sets 16 and 18, such that they may be represented by a single lever 16, 18'.

From the table seen in FIG. 3, brake B1 is the only one of the various brakes and clutches that is engaged to shift transmission 2 into the first forward range. From FIG. 1A, it is seen that actuation of brake B1 grounds ring gear R3 of planetary gear set 18. The inputs to the planetary gear sets are thus the mechanical input on countershaft 26 applied to sun gear S1 at a speed determined by the ratio of spur gears 28, 29 and the hydrostatic output from hydrostatic power unit 4 applied to sun gears S2 and S3 via shaft 20.

Figure 2A:
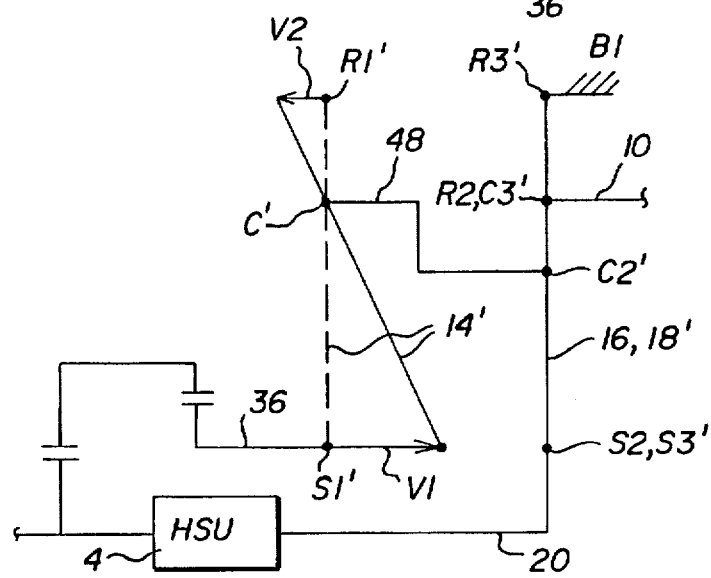
FIGS. 2A–2G are Lever Analogy diagrams providing graphic analyses of the operations of the three planetary gear sets in the transmission embodiment of FIG. 1A in each of the multiple transmission ranges.

FIG. 2A is a graphical representation according to the Lever Analogy of transmission 2 in FIG. 1 while hydrostatic power unit 4 is at zero (0%) stroke, i.e., 1:0 ratio (neutral), and thus its hydrostatic output applied to sun gears S2,S3 is zero. This effectively fixes the position of point S2,S3' representing these gear elements. Since brake B1 fixes the position of point R3' representing ring gear R3, lever 16,18' can be considered as fixed in a vertical orientation. Moreover, since planet gear carriers C1 and C2 are tied together by sleeve shaft 48, point C1', representing carrier C1 on level 14', is also fixed in position. Consequently, lever 14' simply pivots counterclockwise about point C1' in response to the mechanical input on sun gear S1. Vector V1 (pointing rightward) represents that sun gear S1 is driven in the forward direction in response to this input at a speed equal to engine speed ratioed by the spur gear sets 24–25 and 28–29. Vector V2 (pointing leftward) represents that ring gear R1 simply spins in a reverse direction at a speed relative to the sun gear S1 speed determined by the gear ratio of planetary gear set 14. No power is transferred from planetary gear set 14 to the combining planetary gear sets 16 and 18, and thus no output appears on transmission output shaft 10, as is graphically illustrated in FIG. 2A.

It will be appreciated that this transmission neutral condition (no transmission output regardless of engine input power) is achieved only because the hydrostatic power unit 4 is at 0% stroke (1:0 ratio) and thus produces no output power on shift 20. However, with brake B1 engaged, a "true neutral" in the automotive sense is not achieved since transmission output shaft 10 is not free to rotate. Rather, the neutral condition illustrated in FIG. 2A corresponds to a conventional automotive automatic transmission with the shift selector in a drive position and the engine at idle speed with the vehicle brake applied.

To provide "true neutral" in transmission 2 of the present invention, the hydrostatic transmission unit may be depressurized, such as disclosed in applicant's copending application Ser. No. 08/543,545, such that its output shaft 20 is free to turn, or a disconnect clutch may be installed between engine 6 and transmission input shaft 22 to be disengaged along with brake B1, so as to allow the transmission output shaft to freely turn.

Figure 2B:
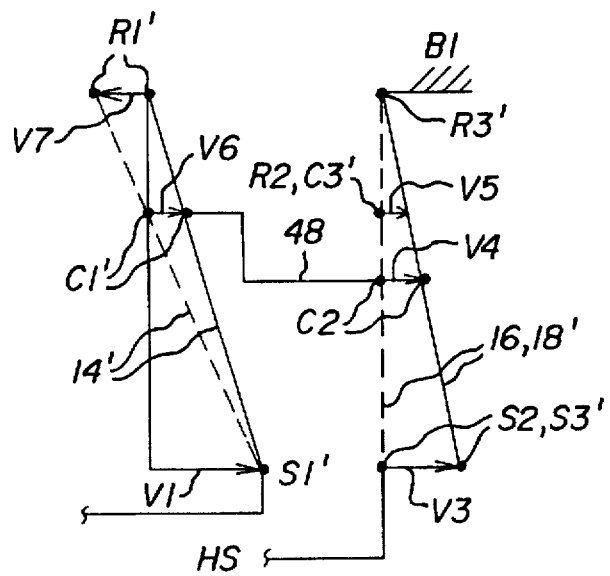

FIG. 2B is a graphical representation according to the Lever Analogy of transmission operation in the first forward speed range. Since brake B1 is engaged, the position of the ring gear R3 representation point R3' is fixed, and thus the combined lever 16,18' representation of planetary gear sets 16 and 18 must swing about this point in response to a hydrostatic output on shaft 20 produced by stroking hydrostatic power unit 4 upwardly from 0% stroke (from 1:0 toward 1:1). This lever swinging motion about the R3' point is from its phantom line position (corresponding to its solid line position in FIG. 1A) toward its solid line position in FIG. 2B. Vectors V3, V4, and V5 represent forward speeds of sun gears S2, S3, planet gear carrier C2, and ring gear R2-planet gear carrier C3—output shaft 10, respectively. Since planet gear carrier C1 is tied to planet gear carrier C2, it is rotating at the same forward speed (Vector V6) as carrier C2 (Vector V4), and Lever 14', representing planetary gear set 14, simply swings about sun gear point S1', allowing carrier C1 to follow the increasing forward speed of carrier C2. The reverse speed (Vector V7) of ring gear R1, which is free to spin and thus exerts no reaction force, progressively decreases as lever 14' swings from its phantom line position (corresponding to its solid line position in FIG. 2A) toward its solid line position in FIG. 2B. However, in process, no mechanical input is applied through planetary gear set 14 to planetary gear set 16.

It is thus seen that first forward range is a pure hydrostatic drive range and is infinitely variable in speed in accordance with the stroking of hydrostatic power unit 4. FIG. 2B graphically illustrates in solid line the lever orientations and the vectors indicate directions and speeds of the elements of planetary gear sets 14, 16, and 18 at a predetermined maximum stroke of the hydrostatic power unit upon achieving the upper end of first forward range.

Figure 2C:
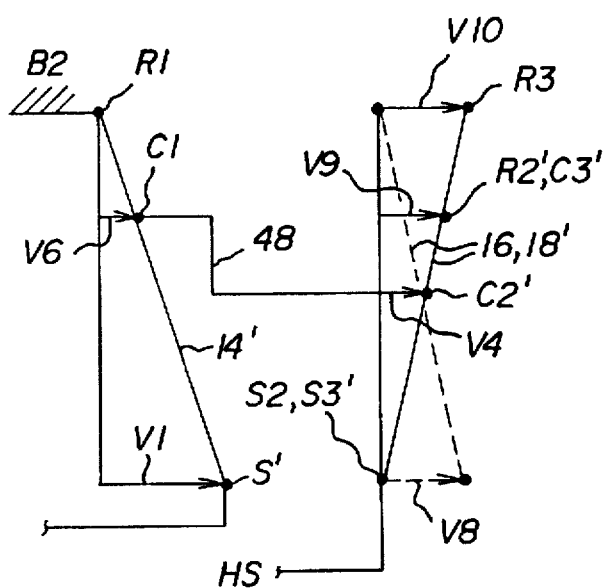

To shift from first forward range to second forward range, brake B1 is disengaged as brake B2 is engaged, as seen in FIG. 3. FIG. 2C graphically illustrates, by Lever Analogy, the actions of the planetary gear set elements in response to second range hydrostatic and mechanical input drives. It is seen that, with brake B2 engaged, ring gear R1 is grounded, thus fixing the position of R1' point on lever 14'. The orientation of lever 14' (and position of carrier point C') is then established by the forward speed of sun gear S1 (Vector V1) determined by the gear-ratioed input power applied thereto from the engine 6 via countershaft 26. Since carriers C1 and C2 are tied together, the forward speed (Vector V6) of carrier C1 can establish carrier C2 as a pivot point C2' for lever 16,18'. It will be appreciated that the positions of points C1' and C2' vary with engine speed, however, at any given engine speed, point C2' can be considered a solid pivot point.

Comparing FIGS. 2B and 2C, it is seen that the orientation of lever 14' in FIG. 2C is the same as its orientation at the top end of first forward range, illustrated in solid line in FIG. 2B. Lever 16,18' is illustrated in phantom line in FIG. 2C in the same orientation (illustrated in solid line in FIG. 2B) it achieved at the top end of first forward range. Now, as the hydrostatic power unit 4 is downstroked in speed (Vector V8) from its maximum stroke at the first range-second range shift point toward a minimum stroke at the top end of second range, lever 16,18' is pivoted about carrier point C2' in the clockwise direction toward its solid line lever position at the top end of second range (FIG. 2C). As a result, the forward speed of the R2,C3' point is seen to increase in infinitely variable fashion, as represented by vector V9.

Figure 2D:
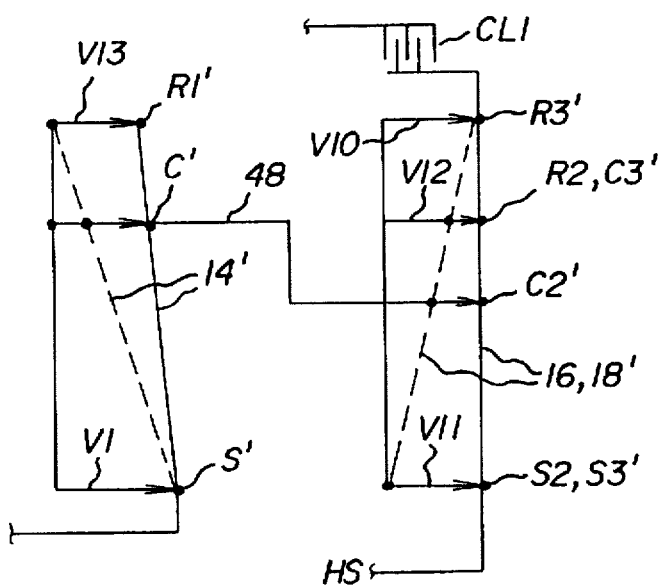

To then shift from second range into third range, brake B2 is disengaged as clutch CL1 is engaged (see table of FIG. 3). From FIG. 1A, it is seen that engagement of clutch CL1 applies mechanical input power from countershaft 26 to ring gear R3 of planetary gear set 18 at engine speed ratioed by spur gear sets 24–25 and 32–33. FIG. 2D represents the actions of the planetary gear elements in third range. The phantom line positions of levers 14' and 16,18' in FIG. 2D represent their Lever Analogy positions at the upper end of the second range (see FIG. 2C). Vector V10 also represents the forward speed of ring gear R3, which corresponds to speed vector V10 gear R3 in FIG. 2C at the upper end of the second range. When clutch CL1 is engaged to shift into third range, the engine-ratioed speed on ring gear R3 establishes a pivot point R3' about which level 16,18' is swung in a counterclockwise direction from its phantom line position toward its solid line position, as the hydrostatic input speed (Vector V11) on sun gears S2, S3 is increased by upstroking hydrostatic power unit 4. At the same time, the engine-ratioed speed on sun gear S1, represented by vector V1, establishes a pivot point S1' about which lever 14' may pivot (since brake B2 is disengaged) to accommodate the increasing speed of the interconnected carriers C1 and C2 (point C1,C2') as the hydrostatic power unit is upstroked through third range.

Thus, planetary gear levers 14' and 16,18' swing about their respective pivot points from their respective phantom line positions at the lower end of third range to their solid line positions at the upper end of third range (FIG. 2D) as hydrostatic power unit stroke is increased. Vector V12 represents the higher output shaft forward speed on ring gear R2, carrier C3 (point R2,C3') at the upper end of third range. Vector V13 represents the forward speed of ring gear R1 at the upper end of third range.

Figure 2E:
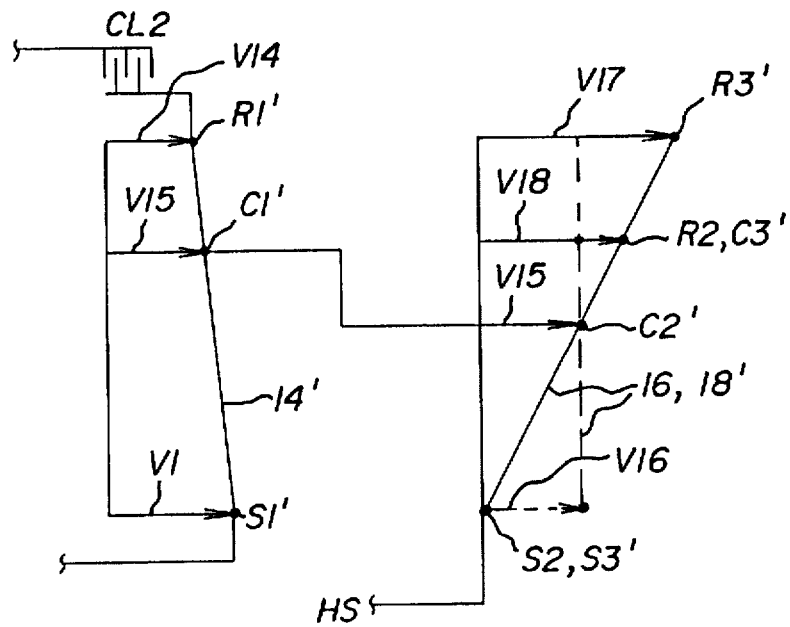

As seen in FIG. 3, shifting from third to fourth range involves disengaging clutch CL1 and engaging clutch CL2. Ring gear R1 of planetary gear set 14 is now driven by the mechanical input of countershaft 26 at engine speed ratioed by the spur gear sets 24–25 and 30–31 (Vector V14). Moreover, since sun gear S1 continues to be driven off countershaft 26 (Vector V1) the orientation of lever 14', seen in FIG. 2E, is fixed by these mechanical inputs, and carrier C1 is driven at a forward speed, represented by vector V15, as is the interconnected carrier C2 of planetary gear set 16. Carrier point C2' can thus serve as a pivot point for lever 16,18'.

It is then seen from FIG. 2E that, as hydrostatic input speed (Vector V16) is decreased by downstroking hydrostatic power unit 4, lever 16,18' is pivoted from its phantom line position toward its solid line position, and the forward speed of ring gear R3 increases (Vector V17) as does the forward speed of the interconnected ring gear R2, carrier C3 (point R2,C3') and output shaft 10 during acceleration through fourth range (Vector V18).

The table in FIG. 3 illustrates that, to shift from fourth range to fifth range, clutch CL2 is disengaged as clutch C3 is engaged. As seen in FIG. 1A, ring gear R3 of planetary gear set 18 is now driven by the mechanical input on countershaft 26 at engine speed ratioed by spur gear sets 24–25 and 34–35.

Figure 2F:
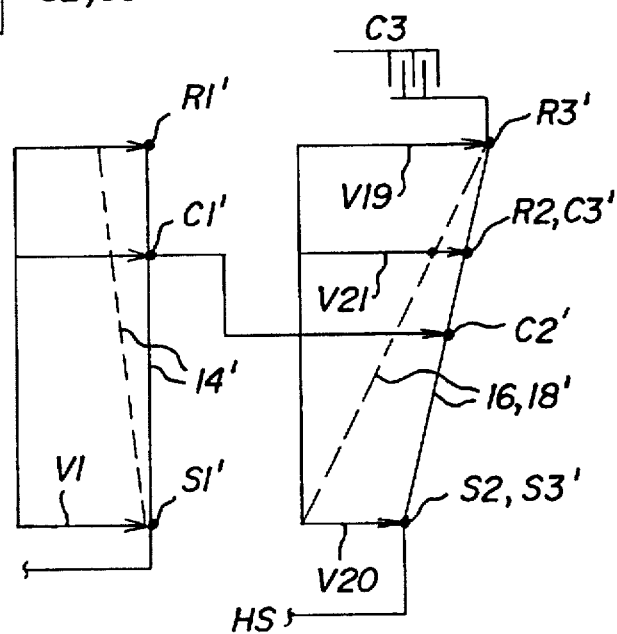

FIG. 2F graphically depicts the actions of the planetary gear elements in fifth range. As in previous graphic representations, the phantom lines illustrate the orientations of levers 14' and 16,18' at the shift point between fourth and fifth ranges. With ring gear R3 now driven off the countershaft 26 at the forward speed represented by vector V19, point R3' is established as a pivot point about which lever 16,18' is swung in the counterclockwise direction as the transmission is accelerated through fifth range by now upstroking (Vector V20) the hydrostatic power unit. This increases the speed of sun gears S2, S3 in infinitely variable fashion, and the forward speed of the ring gear R2 carrier C3 connection (point R2 C3') increases proportionately (Vector V21), as does transmission output speed on shaft 10. Since sun gear S1 of planetary set continues to be driven at the forward speed represented by vector V1, point S' serves as a pivot for lever 14'. Since ring gear R1 is free to spin, lever 14 is free to swing from its dotted line position to its solid line position. As a consequence, the speed of carrier C1 is permitted to increase, as the speed of its interconnected carrier C2 increases during acceleration through fifth range.

Figure 2G:
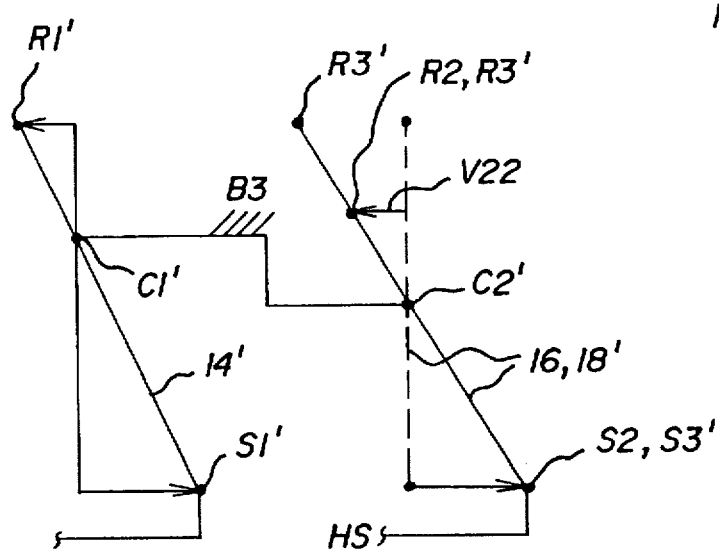

FIG. 2G graphically illustrates operation of the transmission in a reverse range. As illustrated in FIG. 3, shifting into reverse range from a first range neutral condition, imposed by setting a 0% stroke in hydrostatic power unit 4 is achieved by disengaging brake B1 and engaging brake B3. As seen in FIG. 1A, brake B3 grounds carriers C1 and C2 of planetary gear sets 14 and 16. As seen from FIGS. 2G and 2A, the orientation of lever 14' is the same for both first range neutral and reverse range, and the phantom line orientation of lever 16,18' in FIG. 2G, corresponds to its orientation in FIG. 2A at first range neutral. Since both carriers C1 and C2 are grounded by brake B3, carrier C2 provides a pivot point C2' (rather than pivot point R3' in first forward range) about which lever 16,18' pivots from its phantom line to its solid line position as hydrostatic power unit 4 is upstroked through reverse range. Since this lever motion is in the counterclockwise direction, it is seen that speed vector V22 for the interconnected ring gear R2-carrier C3 is now in the left (reverse) direction, which is opposite to the forward vector directions indicated in FIGS. 2B–2F for forward range operations. Thus output shaft 10 is driven in the reverse direction at infinitely variable speeds determined by the stroke setting of hydrostatic power unit 4.

In accordance with a feature of the present invention, by appropriate selection of the gear ratios of planetary gear sets 14, 16, and 18 and the spur gear ratios included in the various power flow paths between engine and the planetary gear sets, synchronous shifting of the transmission between its multiple ranges can be advantageously achieved. This synchronous shifting can be appreciated by again referring to FIGS. 2B–2G.

As seen in FIG. 2B, as transmission 2 is accelerated through first range, the reverse speed (Vector V7) of ring gear R1 decreases. By proper gear ratio design, an appropriate stroke setting of the hydrostatic power unit 4 at approximately 100% (1:1 ratio) that yields a desired first range output speed on shaft 10 may be established when ring gear R1 stops rotating. If, at this operation point, brake B1 is disengaged while brake B2 is engaged, the transmission may be smoothly shifted from first range into second range without disruption of engine speed or transmission output. Thus, the first range to second range shift is synchronous.

An exemplary maximum stroke at this first-second range shift point may be 95%, as indicated in FIG. 3. It is preferable to pick this maximum stroke at less than 100% stroke to account for losses (such as fluid leakage), loading, performance characteristics, etc., that result in the actual hydrostatic output speed at a particular stroke setting being less than the theoretical output speed at that setting.

Now comparing FIGS. 2C and 2D, a synchronous shift point between second and third ranges occurs when the forward speed of ring gear R3, represented by vector V10, is equal to the forward speed of the mechanical input coupled into ring gear R3 by the engagement of clutch CL1. Here again, the ratio of spur gear set 32–33 may be readily selected, such that the forward speed of ring gear R3 at a desired second range maximum speed equals the mechanical input speed that is to be coupled into ring gear R3 by clutch CL1 to provide a synchronous shift point into third range. Since this mechanical input speed is a ratio of engine speed, as is the hydrostatic output speed on shaft 20, a stroke setting of the hydrostatic transmission unit can be readily determined that will yield this forward speed equality between ring gear R3 and the mechanical input from countershaft 26 ratioed by spur gear set 32–33. When this predetermined stroke setting (actually a low stroke setting, e.g., 9% stroke) is reached at the upper end of second range, clutch C1 is engaged as brake B2 is disengaged to achieve synchronous shifting from second range to third range.

Now, by comparing FIGS. 2D and 2E, a synchronous shift from third range to fourth range can be achieved by selecting a ratio of spur gear set 30–31, such that the forward speed of this mechanical input equals the forward speed of ring gear R1 (Vector V13 equals vector V14) at a desired maximum stroke approximately 100%, e.g., 95% stroke (FIG. 3). Clutch CL2 is then engaged as clutch CL1 is disengaged to achieve a synchronous shift from third to fourth ranges.

Synchronous shift from fourth range, illustrated in FIG. 2E, to fifth range, illustrated in FIG. 2F, is achieved by selecting the ratio of spur gear set 34–35 such that the forward speed of this mechanical input from countershaft 26 is matched by the forward speed of ring gear R3 (Vector V17 equals vector V19) at an appropriate minimum stroke setting, e.g. 9% (FIG. 3), of the hydrostatic power unit at the upper end of fourth range. Then, clutch CL3 is engaged, while clutch CL2 is disengaged, to synchronously shift from fourth range into fifth range. Accelerating through fifth range is achieved by upstroking power transmission unit 4 to a maximum transmission output speed at 100% stroke (1:1 ratio).

It can also be seen, from a comparison of FIGS. 2A and 2G, that carrier C1 is stationary when brake B3 is engaged as brake B1 is disengaged to permit a synchronous shift from first range neutral to the reverse range. Acceleration through the reverse range by upstroking hydrostatic power unit 4 is indicated by vector 22. Similarly, ring gear R3 is stationary at the lower end the reverse range at 0% hydrostatic power unit stroke, and thus brake B1 can be engaged as brake B3 is disengaged to synchronously shift back into first range neutral from reverse range.

The table of FIG. 3, referred to above, identifies which one of the brakes and clutches is engaged in each of the five forward transmission ranges and the single reverse range. Also indicated in this table are representative stroke ranges of the hydrostatic power (HSP) unit 4 to accelerate through each of the ranges, the direction of stroke, and the stroke setting at the range shift points. This table also indicates representative ranges of speed ratios of engine speed (Vin) on input shaft 22 and transmission output speed (Vout) on shaft 10 in each range. Note that transmission 2 goes into overdrive at the upper end of fourth range, and that fifth range is a full overdrive range.

Those skilled in the transmission art will appreciate that additional forward ranges may be added, such as a sixth range similar to fourth range and a seventh range similar to fifth range. However, implementation of these higher ranges increases the complexity of the transmission and likely will not address vehicle dynamics and utility considerations as effectively as the disclosed five-range transmission 2 of FIG. 1. In particular, fourth and fifth range vehicle operations will unlikely be utilized at high engine speed. This is mainly because the vehicle will be power limited, unless engine power is significantly increased. The primary value of fourth and fifth ranges is to maximize fuel economy and to reduce noise, vibration and harshness under steady state conditions. For example, a vehicle equipped with the transmission 2 of FIG. 1 may be able to cruise at 60 mph with an engine speed of as low as 1200 RPM, yet provide immediate and smooth acceleration for passing by reducing transmission ratio as engine power is increased.

While the forgoing description deals with the progressive increase in output speed from neutral to the multiple forward speed ranges to a maximum transmission output speed, decreasing output speed from maximum to neutral would be accommodated in a reverse manner. That is, rather than upstroking the hydrostatic transmission unit to accelerate through the odd numbered forward ranges and downstroking during the even numbered forward ranges to accelerate from neutral to maximum speed, the hydrostatic transmission would be downstroked during the odd numbered ranges and upstroked during the even numbered ranges to decelerate from maximum speed to neutral. Synchronous shift from range to range during deceleration would be accomplished in the manner described above for acceleration through the ranges. It would be understood by those skilled in the transmission art upon consideration of the foregoing description, that, for example, a downshift from fifth range to third range and the transmission embodiment of FIG. 1a, as may be necessary during a hard braking operation, can be easily accomplished by releasing clutch C3 and applying clutch C1 simultaneously with an appropriate change in stroke of the hydrostatic transmission unit.

The foregoing description has focussed on speed ratio aspects of transmission 2 in terms of achieving infinitely variable output speed in all ranges and acceleration through the forward speed ranges from first range neutral to maximum speed at the top end of fifth range. Another equally important aspect of transmission 2 is torque ratio. As is well understood by those skilled in the art, for any given transmission operating point, input power of the engine will equal the output load imposed on the transmission. Engine output power is a function of the product of engine speed and engine torque imposed on the transmission input shaft. Output load is a function of the product of transmission output speed and load torque imposed on the transmission output shaft. By its function, a transmission will alter the values of speed and torque over its multiple ranges. Yet power, the product of speed and torque, is always balanced. As described in the above-cited Benford et al. article, the Lever Analogy technique can also be utilized to determine power balance on each of the planetary gear sets 14,16 and 18 in transmission 2 of FIG. 1. Since one skilled in the art will understand from a study of the Benford et al. paper how to conduct a Lever Analogy analysis for power balance with respect to a multi-range hydromechanical transmission structured in accordance with the present invention, such an analysis here will not be undertaken here for the sake of brevity.

However, several observations with regard to power flow in the hydrostatic power unit 4 and the mechanical power unit 8, should be noted. From the foregoing description, it will be appreciated that, in the first forward and reverse ranges, the direction of power flow is forward through hydrostatic power unit 4 and planetary gear sets 16,18 to output shaft 10. However, at the first-second range shift point, power flow is altered by the involvement of mechanical power unit 8. Because this shift is synchronous, the speeds of all planetary gear elements remain unchanged until the hydrostatic transmission unit 4 is stroked downwardly to begin the introduction of mechanical power flow through mechanical power unit 8. Since the hydrostatic power unit is being stroked downwardly to accelerate through second range, power flow through the hydrostatic power unit is reversed. This power flow reversal in the hydrostatic transmission unit also occurs in fourth range.

Consequently, an important consideration in selecting the planetary gear ratios is to maintain a nearly constant torque on the hydrostatic transmission unit during these power flow reversal. To do so is to minimize hydraulic pressure changes in the hydrostatic transmission unit that would alter efficiency and require a stroke offset to adjust to an abrupt change in power magnitude. In practice, some stroke offset may be needed to increase hydrostatic pressure so as to compensate for mechanical losses. It will appreciated that the better the "power match" at the range shift points, the smoother the power flow through the transmission. Power match considerations are most important at the lower range shift points (first range to second range) when hydrostatic pressure in hydrostatic power unit 4 is highest.

Since power flow in second and fourth range is reversed, and thus flows from output to input of the hydrostatic transmission unit, rather than from input to output in the first, third, and fifth ranges, such reversal of power flow is effectively regenerative power flow, which must also be considered in order to achieve synchronous shifting. As noted above, any abrupt change in torque will cause a correspondingly abrupt change in hydrostatic pressure in the hydrostatic power unit. Although hydraulic fluid is effectively incompressible, such sudden pressure changes will alter the efficiency of the hydrostatic transmission unit, typically as a result of excessive fluid leakage. Consequently, a shift offset adjustment of hydrostatic stroke may be required concurrently with each range shift to counterbalance abrupt torque changes. Appropriate shift offsets usually differ at each shift point and are also affected by load. Shift offsets may also be used to compensate for changes in mechanical power unit efficiency in various ranges. In practice, shift offsets are usually less than 5% stroke, and thus it is desirable to leave some stroke margin at the shift points to allow for the implementation of any shift offsets.

In accordance with another important feature of the present invention, the ratios of planetary gear sets 14 and 16 are identical, such that regenerative power will transfer equally to planetary gear set 18. Theoretically, a perfect power match is achieved when the identical ratio of planetary gear sets 14 and 16 is greater than the ratio of planetary gear set 18 by +1.

Operation of hydromechanical transmission 2 of FIG. 1 in its various ranges and synchronous shifting between ranges is controlled by a transmission controller 70, illustrated in FIG. 4. This transmission controller receives operator speed input commands in terms of accelerator pedal position signals and range selection signals in terms of the position of a shift selection lever being in either of drive (D), neutral (N), or reverse (R) positions. The transmission controller 70 also receives engine speed sensor signals indicating the RPMs of transmission input shaft 22 and output speed sensor signals indicating the RPMs of transmission output shaft 10. In response to these input signals, transmission controller 70 outputs signals to actuate selected ones of the brakes B1–B3 and clutches CL1–CL3. The transmission controller also outputs ratio control signals to a ratio controller, illustrated schematically in FIG. 5 at RC, for controlling the stroking of hydrostatic power unit 4. Such radio control signals may be in the form of pulse width modulated (PWM) signals, such as disclosed in applicant's copending applications, Ser. Nos. 08/380,269 and 08/423,069. As also illustrated in FIG. 4, transmission controller 70 outputs a signal for establishing a "true neutral" condition in hydromechanical transmission 2. This signal may be used by ratio controller RC in FIG. 5, if this ratio controller and hydrostatic power unit 4 are equipped with the decompression feature disclosed in the above-cited U.S. patent application Ser. No. 08/543,545. Alternatively, this neutral signal may be applied to disengage an input clutch (not shown) included in the drive train between engine 6 and transmission input shaft 20.

While transmission controller 70 may be implemented with analog or fluidic circuitry, digital implementation is preferred. Thus, all of the input signals to the transmission controller 70 are digitized by analog-to-digital converters and then processed by a microprocessor.

Two major functions of transmission controller 70 are to engage the clutches and brakes at the proper times to achieve synchronous range shifting and to effectively match engine power to output load by stroke control of hydrostatic power unit 4. Matching engine power to output power requires a predetermination of engine output power and fuel efficiency at various engine speeds. Having done this, it is possible to determine the optimum engine power/fuel economy operating point at every pedal position (speed command). This relationship, termed "schedule curve", may be stored as an algorithm in a memory associated with the transmission controller microprocessor.

During vehicle operation, the microprocessor continuously compares the operator speed commands to engine speed and adjusts the transmission ratio (hydrostatic power unit stroke) to match the schedule curve. Should the vehicle encounter a grade, output load increases and engine speed decreases. However, if the operator maintains pedal position (Constant speed command), transmission controller 70 strokes the hydrostatic power unit to reduce transmission ratio until the schedule curve is again matched. At this point, engine speed and power have recovered, but vehicle speed has decreased. If the operator repositions the accelerator pedal to maintain vehicle speed on the grade, engine speed is increased to match the higher output load. Every engine has a unique, optimum schedule curve that can readily be programmed into the transmission controller microprocessor to adapt transmission 2 to any particular vehicle engine.

While a variety of hydrostatic power units may be implemented in the hydromechanical transmission of the present invention, the unique capabilities of a hydrostatic power unit of the type disclosed in Folsom, U.S. Pat. No. 5,423,183 render it particularly suitable for application in the present invention. The complete disclosure of this patent is expressly incorporated by reference herein, and a generalization of this disclosure is illustrated in FIG. 5. As seen in this figure, hydrostatic power unit 4 includes a hydraulic pump unit, generally indicated as 72, driven by an input shaft 74 that may correspond to transmission input shaft 22 in FIG. 1. An output shaft 76, which may correspond to output shaft 20 in FIG. 1, extends through a central opening in a hydraulic motor unit, generally indicated at 78, that is grounded to a unit housing, as indicated at 79. A cylinder block 80 of the driven pump unit 72 and a cylinder block 82 of the grounded motor unit 78 are respectively pivotally mounted so as to assume interfacial contacts with a wedge-shaped swashplate 84 that is torque-coupled to output shaft 76 by a pivotal connection, indicated at 86. As input shaft 74 is driven by engine 6 in FIG. 1, pumped exchanges of pressurized hydraulic fluid between the hydraulic pump 72 and motor 78 units through swashplate ports 84a produce a resultant torque on the swashplate 84 that is coupled to the output shaft 76 by coupling 86 as output hydrostatic torque. To change the ratio of input speed on shaft 74 to output speed on shaft 76, ratio controller RC is connected, as indicated at 87, to pivot swashplate 84 about an axis of coupling 86 that intersects the axis 76a of output shaft 76. This angular adjustment of swashplate orientation (angle) strokes hydrostatic power unit 4 to produce a unidirectional, infinitely variable speed hydrostatic output on shaft 76 at ratios ranging from 1:0 (0% stroke) or neutral to at least 1:1 (100% stroke).

The hydrostatic power unit of the type disclosed in U.S. Pat. No. 5,423,183 has a torque multiplying capability of approximately 5:1 at low speed ratios (low stroke settings), which is more than ample torque to accelerate a vehicle from a standing start in the hydrostatic first forward and reverse ranges of transmission 2. Other unique and beneficial characteristics of this type of hydrostatic power unit that lend to application in the hydromechanical transmission of the present invention are set forth in the cited Folsom patent.

Figures 6A, 6B:
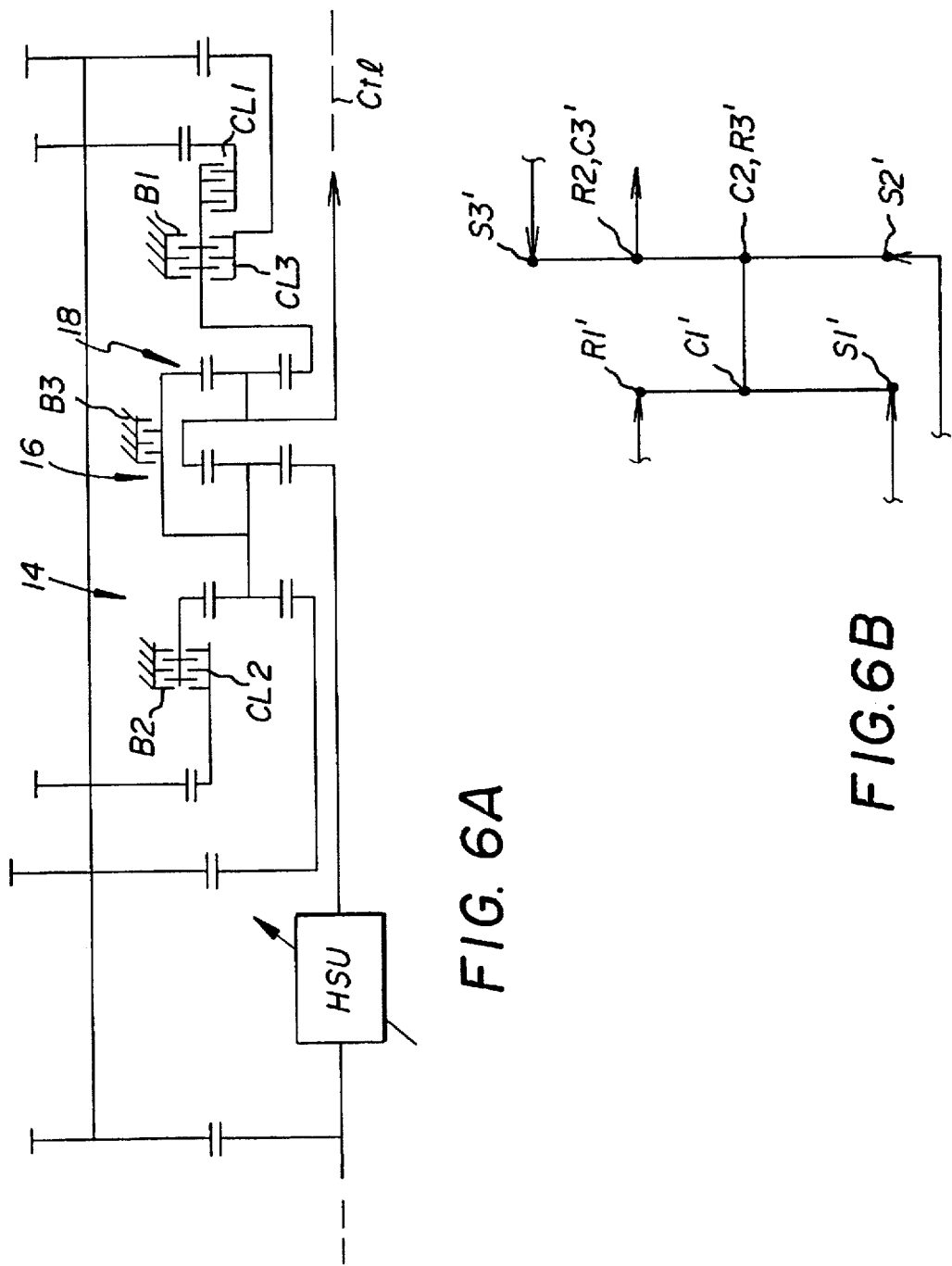

FIG. 6A illustrates in schematic diagram an alternative embodiment of the invention, which differs from the embodiment of FIG. 1 in that the combining gear mechanism, comprised of planetary gear sets 16 and 18, are arranged in a "simple-compound" configuration, whereas planetary gear sets 16 and 18 in FIG. 1A are arranged in a simple "Simpson" configuration. FIGS. 6B illustrates an appropriate Lever Analogy diagram with planetary gear sets 16 and 18 combined as a single lever 16,18'.

FIG. 7A illustrates yet another embodiment of the present invention, wherein the combining planetary gear sets 16 and 18 are arranged in a "Ravigneaux" configuration. Note that, in this configuration, carriers C2 and C3 are in the form of a compound carrier with intermeshing planet gears, and thus ring gear R2 is eliminated. FIGS. 7B provides a Lever Analogy diagram for analysis of the planetary gear sets in FIG. 7A, with planetary gear sets 16 and 18 again combined as a single lever 16,18'.

The operations of the transmission embodiments of FIGS. 6A and 7A in five forward ranges and one reverse range with synchronous shifting between ranges are as described above with respect to transmission 2 of FIG. 1A.

It will be appreciated that the schematic diagrams of the transmission embodiments in FIGS. 6A and 7A have been simplified by omitting the lower symmetrical halves of the planetary gear elements and sleeve shafts.

Figures 8, 9:
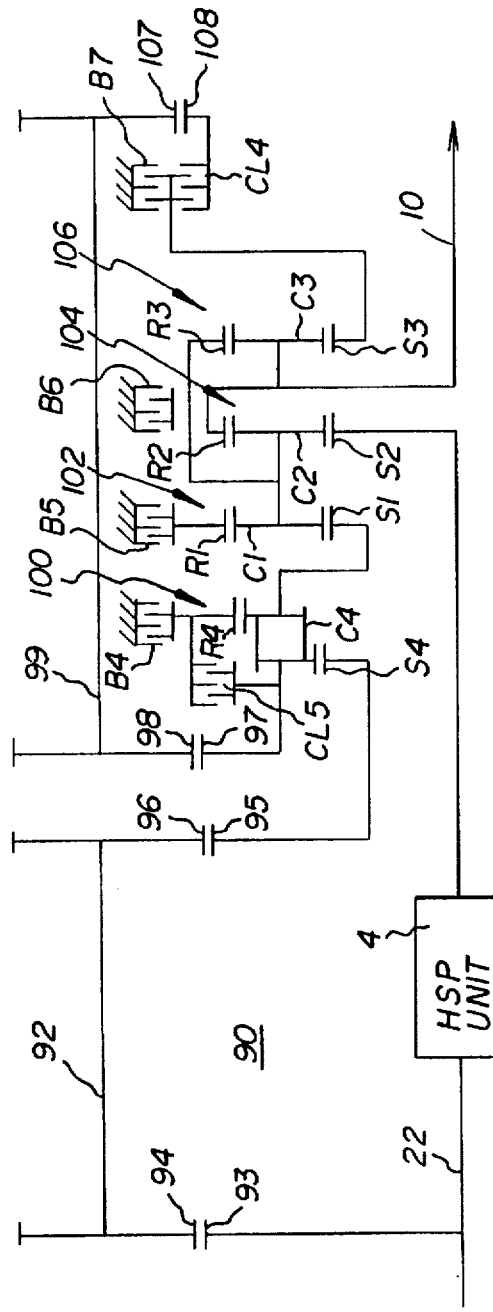
FIGS. 8 and 9 are schematic diagrams of additional hydromechanical transmission embodiments of the present invention.

FIG. 8 illustrates a further embodiment of the invention directed to a multi-range hydromechanical transmission 90 having particular application in construction vehicles, such as wheel loader-type construction vehicles. Since such vehicles are typically propelled as often in the forward direction as in the reverse direction, transmission 90 of this embodiment of the invention provides three forward ranges and three reverse ranges.

To achieve this capability, four planetary gear sets; a reversing compound planetary gear set, generally indicated at 100, an input planetary gear set, generally indicated at 102, and a pair of interconnected, combining planetary gear sets, generally indicated at 104 and 106. As in the transmission embodiments described above, transmission input shaft 22 drives a hydrostatic power unit 4. A countershaft 92 is driven off the transmission input shaft via spur gears 93 and 94. From this countershaft, sun gear S4 of the reversing planetary gear set 100 is driven off countershaft 92 via spur gears 95 and 96. The compound planet gear carrier C4 of planetary gear set 100 is connected via spur gear set 97-98 to a second countershaft 99. This second countershaft is also connected to drive a sun gear S3 of planetary gear set 106 via a clutch CL4 drive and spur gear set 107-108. Ring gear R4 of planetary gear set 100 is selectively grounded by a brake B4 and is also selectively coupled to carrier C4 via a clutch CL5. Compound carrier C4 is also connected to sun gear S1 of planetary gear set 102. Brake B5 selectively grounds ring gear R1 of this planetary gear set, while the carrier C1 is connected both to carrier C2 of planetary gear set 104 and to ring gear R3 of planetary gear set 106. Brake B6 selectively grounds the interconnection of carriers C1, C2 and ring gear R3. Ring gear R2 of planetary gear set 102 is connected in common with carrier C3 of planetary gear set 106 and transmission output shaft 10. Brake B7 selectively grounds sun gear S3 of planetary gear set 106.

FIG. 10 provides a table indicating the various brakes and clutches that are engaged to operate transmission 90 in each of its three forward ranges and three reverse ranges, together with representative of strokings of hydrostatic power unit 4 for accelerating through each of the transmission ranges and corresponding speed ratio ranges in each of the transmission ranges.

For the sake of brevity, the Lever Analogy analysis diagrams, such as provided for transmission 2 FIG. 1A, are omitted, since those skilled in the art will be able to perform this analysis for transmission 90 in the manner illustrated in FIGS. 2A–2G above.

From FIG. 8, it is seen that sun gear S4 of reversing planetary gear set 100 is continuously driven in a forward direction via countershaft 92 and spur gear set 95–96. As seen in FIG. 10, to shift transmission 90 to its first forward range, clutch CL5 and brake B7 are engaged. Clutch CL5 is seen to interconnect carrier C4 and ring gear R4 of reversing planetary gear set 100, and thus these two gear elements are driven by sun gear S4 at the same forward speed. This forward speed drive is applied via spur gear set 97–98 to drive secondary countershaft 99. However, since clutch CL4 is disengaged, no mechanical input is applied to sun gear S3 of planetary gear set 106. Rather, this sun gear is grounded by break B7 in the first forward range. Since sun gear S1 of planetary gear set 102 is also connected to carrier C4 of reversing planetary gear set 100, these two gear elements are driven at the same forward speed. Sun gear S2 of planetary gear set 104 is driven by the output of hydrostatic power unit 4 and, in turn, drives carriers C1,C2 and ring gear R3 of planetary gear set' 106 at an increasing forward speed as the hydrostatic power unit is upstroked.

Since sun gear S3 of planetary gear set 106 is grounded by brake B7, this gear element serves as a pivot about which the combined lever (not shown), representing planetary gear sets 104 and 106, is swung in response to increasing speed of the hydrostatic power unit output. The commonly connected ring gear R2, carrier C3, and output shaft 10 increase in forward speed as the hydrostatic power unit is stroked from zero percent toward a representative maximum stroke of 95% (FIG. 10) to accelerated through the first forward range.

To shift from first range to second range, as seen in FIG. 10, brake B7 is disengaged as brake B5 is engaged, while clutch CL5 remains engaged. Sun gear S3 is released, and ring gear R1 is now braked, as can be seen from FIG. 8. Since sun gear S1 continues to be driven in the forward direction by the mechanical input from countershaft 92 via planetary gear set 100, the forward speed of carrier C1 establishes the carrier C2 point on the combined lever representing planetary gear sets 104 and 106 as a fulcrum. As the hydrostatic power unit is now downstroked from 95% toward 0%, the combined lever (not shown) is pivoted about this fulcrum, such that the forward speed of the commonly connected ring gear R2, carrier C3, and output shaft 10 is accelerated through the second forward speed range. It is seen that this second forward range operation corresponds to the operation described above for the second range of the transmission of FIG. 1A illustrated in FIG. 2C.

Shifting into third gear involves disengaging brake B5 and engaging clutch CL4 (FIG. 10). It now seen that the forward drive applied to countershaft 99 via clutch CL5, which was also engaged during the first and second forward ranges, is now applied as a mechanical input to sun gear S3 via the engaged clutch CL4. Sun gear S3 is thus driven at a forward speed effective to establish a pivot point for the combined lever representing planetary gear sets 104 and 106. Consequently, when the stroke of hydrostatic power unit 4 is increased from 0% towards the maximum stroke, e.g., 100%, this combined lever is swung about this established pivot point in a direction to further increase the forward speed of ring gear R2 and carrier C3, and thus output shaft 10 accelerates the vehicle through third forward range.

To condition transmission 90 for the three reverse ranges, brake B4 is engaged to ground ring gear R4 of the reversing planetary gear set 100. To shift into the first reverse range, brake B6 is engaged concurrently with brake B4 to ground the commonly connected carriers C1, C2, and ring gear R3. As in the three forward arranges, sun gear S4 of the reversing planetary set 100 continues to be driven in the forward direction by the mechanical input applied from countershaft 92. However, with ring gear R4 grounded, this forward drive on sun gear S4 drives carrier C4 in the reverse direction, and this reverse direction drive is applied to countershaft 99 via spur gear set 97-98. Compound carrier C4 also drives sun gear S1 of planetary gear set 102 in the reverse direction. Grounding of the commonly connected carriers C1,C2 and ring gear R3 by brake B6 establishes the point representing carrier C2 and ring gear R3 on the combined lever representing planetary gear sets 104 and 106 is established as a fulcrum. As the speed of the hydrostatic input on sun gear S2 is increased by stroking hydrostatic power unit 4 upwardly from 0% stroke, this combined lever is rocked about this fulcrum in a direction to produce driving rotation of the commonly connected carrier C3 and ring gear R2 in the reversed direction, and thus output shaft 10 is driven in the reverse direction at the infinitely variable speeds determined by stroking the hydrostatic power unit 4. It will be noted that this description corresponds to the description of the single reverse range operation of transmission 4 in FIG. 1A and the lever diagram of FIG. 2G.

Second reverse range of transmission 90 is established by disengaging brake B6 and engaging clutch CL4, while brake B4 remains engaged. This is seen in FIG. 8 to apply the reverse direction mechanical drive on countershaft 99 to sun gear S3. This establishes sun gear S3 as a pivot point on the combined lever representing planetary gear sets 104 and 106, about which this lever is swung in a direction to increase the reverse speed of the commonly connecting gear R2, carrier C3, and output shaft 10, as hydrostatic power unit 4 is stroked downwardly toward 0% stroke.

Finally, in the third reverse range, brake B5 is engaged concurrently with the brake B4. As seen in FIG. 8, brake B5 grounds ring gear R1. Since sun gear S1 continues to be driven in the reverse direction while ring gear R1 is grounded, carrier C1 establishes the combined lever point representing carrier C2 and ring gear R3 as a pivot. Then, as hydrostatic power unit 4 is stroked upwardly to increase the speed of its forward drive on sun gear S2, and the combined planetary gear set 104, 106 lever is pivoted about this point in a direction to increase the speed of the reverse direction drive produced on ring gear R2, carrier C3, and hence output shaft 10, thus to accelerate through the third reverse range.

By virtue of compound planet gear carrier C4 of reversing planetary gear set 100, speed and torque in each forward range can be made to essentially equal speed and torque in each corresponding reverse range, as indicated in FIG. 10.

The transmission schematic of FIG. 9 corresponds to transmission 90 of FIG. 8, and except that the transmission of FIG. 9 is reconfigured to eliminate the short countershaft 92 used to deliver mechanical input power to sun gear S4 of the reversing planetary gear set 100. Thus, the alternative embodiment of FIG. 9 is conditioned to its three forward and three reverse speed ranges in the same manner as described for the transmission 90 of FIG. 8.

It is seen from the foregoing description that the present invention provides a continuously variable, multi-range, synchronous shift transmission capable of propelling a motor vehicle in a most efficient manner by changing transmission ratio to precisely match engine power to output load. In fact, engine power may be held at the engine's point of peak operating efficiency as the vehicle is accelerated from rest to maximum speed. Further, the transmission embodiments of the invention offer a smooth, stepless, power flow across the entire operating range without cycling and shock loading to the vehicle drive system. Thus, the present invention affords the capability to precisely match engine power to varying output loads to achieve optimum fuel economy as well as acceleration and overall vehicle performance.

It will be apparent to those skilled in the art that great modifications and great variations could be made in the multi-range hydromechanical transmission of the present invention and in the constructions of the invention embodiments as set forth above without departing from the scope or the spirit of the invention.

Other embodiments of the invention will be apparent to those skilled in the art from consideration of the specification and practice of the invention disclosed herein. It is intended that the specification and examples be considered as exemplary only, but the true scope and spirit of the invention being indicated by the following claim.

What is claimed is:

1. A vehicular multi-range hydromechanical transmission comprising, in combination:

a transmission controller for receiving operator speed commands;

a hydrostatic power unit having a first mechanical input for driving connection to a prime mover and a unidirectional hydrostatic output, the hydrostatic power unit operatively connected for control by the transmission controller to provide an infinitely variable transmission ratio between a speed of the first mechanical input and a speed of the hydrostatic output over a continuous range of 1:0 to 1:1; and a mechanical power unit having a second mechanical input for driving connection to the prime mover and a transmission output for connection to a load, the mechanical power unit including:

a first planetary gear set having a first gear element connected to the second mechanical input at a first gear ratio, and second and third gear elements;

a combining gear mechanism including second and third interconnected planetary gear sets having a fourth gear element connected to the third gear element of the first planetary get set, a fifth gear element connected to the hydrostatic output, a sixth gear element connectable to the second mechanical input at a second gear ratio, and a seventh gear element connected as the transmission output; and range shifting means actuated by the transmission controller in response to the operator input speed command for braking and/or clutching selected gear elements of the first, second, and third planetary get sets to produce an infinitely variable output speed at the transmission output within each of at least one reverse range and at least first, second, and third forward ranges.

2. The transmission defined in claim 1, wherein the range-shifting means includes a first brake actuated by the transmission controller to ground the sixth gear element of the second and third planetary gear sets, thereby to establish a transmission neutral condition at the transmission output while the transmission ratio of the hydrostatic power unit, set by the transmission controller, is 1:0, and to produce infinitely variable output speed at on the transmission output in the first forward range in direct relation to the infinitely variable speed of the hydrostatic output at transmission ratios other than 1:0.

3. The transmission defined as defined in claim 2, wherein the range-shifting means further includes a second brake actuated by the controller to ground the third gear element of the first planetary gear set and the fourth gear element of the second and third planetary gear sets, and thereby produce infinitely variable output speed at the transmission output in the reverse range in direct relation to the infinitely variable speed of the hydrostatic output at transmission ratios other than 1:0.

4. The transmission defined in claim 3, wherein the range-shifting means further includes a third brake actuated by the controller to ground the second gear element of the first planetary gear set and thereby produce infinitely variable output speed at the transmission output in the second forward range in reverse relation to the infinitely variable speed of the hydrostatic output.

5. The transmission defined in claim 4, wherein the range-shifting means further includes a first clutch actuated by the controller to connect the sixth gear element to the second mechanical input and thereby produce infinitely variable output speed at the transmission output in the third forward range in direct relation to the infinitely variable speed of the hydrostatic output.

6. The transmission defined in claim 5, wherein the first and second gear ratios and gear ratios of the first, second, and third planetary gear sets have coordinated values to enable the controller to engage and disengage the first and third brakes and the first clutch in timed relation to input speed of the prime mover and transmission ratio of the hydrostatic unit, such as to achieve synchronous shifting between the first and second forward ranges and between the second and third forward ranges.

7. The transmission defined in claim 5, wherein the first gear element is a first sun gear, the second gear element is a first ring gear, the third and fourth gear element are respective first and second planet gear carriers, the fifth gear element is a second sun gear, the sixth gear element is a second ring gear, and the seventh gear element is a third planet gear carrier.

8. The transmission defined in claim 7, wherein the second planet gear carrier is included in the second planetary gear set, the second planetary gear set further including a third ring gear fixedly connected to the third planet gear carrier included in the third planetary gear set.

9. The transmission defined in claim 8, wherein the third planetary gear set includes a third sun gear fixedly connected to the second sun gear included in the second planetary gear set.

10. The transmission defined in claim 5, wherein the first gear element is a first sun gear, the second gear element is a first ring gear, the third and fourth gear element are respective first and second planet gear carriers of the first and second planetary gear sets, the fifth gear element is a second sun gear of the second planetary gear set, the sixth gear element is a third sun gear of the third planetary gear set and the seventh gear element is a third planet gear carrier of the third planetary gear set.

11. The transmission defined in claim 10, wherein the second planetary gear set includes a second ring gear fixedly connected to the third planet gear carrier, and the third planetary gear set includes a third ring gear fixedly connected in common with the first and second planet gear carriers.

12. The transmission defined in claim 5, wherein the first gear element is a first sun gear, the second gear element is a first ring gear, the third and fourth gear elements are respectively a first planet gear carrier of the first planetary gear set and a compound planet gear carrier of the second and third planetary gear sets, the fifth gear element is a second sun gear of the third planetary gear set, the sixth gear element is a third sun gear of the third planetary gear set, and the seventh gear element is a combination of a second ring gear of the third planetary gear set and compound planet gear carrier of the second and third planetary gear sets.

13. The transmission defined in claim 5, wherein the range-shifting means further includes a second clutch actuated by the controller to connect the second gear element to the second mechanical input at a third gear ratio and thereby product an infinitely variable output speed at the transmission output in a fourth forward transmission range in inverse relation to the infinitely variable speed of the hydrostatic input.

14. The transmission defined in claim 13, wherein the range shifting means further includes a third clutch actuated by the controller to connect the sixth gear element to the second mechanical input at a fourth gear ratio and thereby produce infinitely variable output speed at the transmission output in a fifth forward transmission range in direct relation to the infinitely variable speed of the hydrostatic output.

15. The transmission defined in claim 14, wherein the first to fourth gear ratios and gear ratios of the first to third planetary gear sets have coordinated values to enable the controller to actuate the first to third brakes and the first to third clutches in timed relation to input speed of the prime mover and the transmission ratio of the hydraulic transmission unit, such as to achieve synchronous range shifting during acceleration through the first to fifth forward ranges.

16. The transmission defined in claim 5, wherein the hydrostatic power unit includes:

an input shaft for driving connection to the first mechanical input;

an output shaft having an axis and on which the hydrostatic output is produced;

a hydraulic pump unit driven by the input shaft;

a stationary hydraulic motor unit;

a wedge-shaped swashplate operatively positioned to accommodate pumped exchanges of hydraulic fluid between the hydraulic pump and motor units through ports in the swashplate, the swashplate connected in torque-coupled relation with the output shaft and adjustable about a pivot axis, intersecting the output shaft in orthogonal relation, through a continuous range of swashplate angles; and a ratio controller operable by the transmission controller to pivot the swashplate through the range of swashplate angles and thereby stroke the hydrostatic power unit through the 1:0 to 1:1 transmission ratio range.

17. The transmission defined in claim 1, wherein gear ratios of the first and second planetary gear sets are equal and greater than a gear ratio of the third planetary set by +1.

18. A vehicular multi-range hydromechanical transmission, comprising, in combination:

- a transmission controller for receiving operator input commands;
- a hydrostatic power unit having a first input shaft for connection to a vehicle engine and a first output shaft, the hydrostatic transmission operatively connected to the transmission controller for producing an infinitely variable transmission ratio between a speed of the first input shaft and a speed of a hydrostatic output on the first output shaft over a continuous range of 1:0 to 1:1; and
- a mechanical power unit having a second input shaft for driving connection to the prime mover and a second output shaft for connection to deliver output power to at least one vehicle driving wheel, the mechanical power unit including:
  - a first planetary gear set having a first gear element connected to the second input shaft at a first gear ratio, and second and third gear elements;
  - a second planetary gear set having a fourth gear element connected to the second gear element of the first planetary gear set, and fifth and sixth gear elements;
  - a combining gear mechanism including third and fourth planetary gear sets having a seventh gear element connected to receive the hydrostatic output on the first output shaft, an eighth gear element connected to the fifth gear element of the second planetary gear set, a ninth gear element connected to the second output shaft, a tenth gear element connectable to the second and third gear elements of the first planetary gear set at a second gear ratio, an eleventh gear element connected in common with the ninth gear element and the second output shaft, and a twelfth gear element connected in common with the eight gear element and the fifth gear element of the second planetary gear set; and
  - range-shifting means actuated by the transmission controller in response to operator input commands for braking and/or clutching selected first to twelfth gear elements of the first to fourth planetary gear sets to produce infinitely variable output speeds on the second output shaft in each of a plurality of forward speed ranges and each of a corresponding plurality of reverse speed ranges, the corresponding pluralities of forward and reverse speed ranges being separated by a transmission neutral.

19. The transmission defined in claim 18, wherein the range-shifting means includes:

- a first brake and a first clutch actuated by the transmission controller in concert to ground the twelfth gear element and to interconnect the second and third gear elements of the first planetary gear set, thereby to establish the transmission neutral while the transmission ratio of the hydrostatic power unit set by the transmission controller is 1:0 to produce zero hydrostatic output speed on the first output shaft, and to produce infinitely variable output speed on the second output shaft in a first forward transmission range in direct relation to the infinitely variable hydrostatic output speed on the first output shaft at transmission ratios other than 1:0;
- a second brake, actuated in concert with the first clutch by the transmission controller, to ground the sixth gear element of the second planetary gear set and to interconnect the second and third gear elements of the first planetary gear set, and thereby produce an infinitely variable output speed on the second output shaft in a second forward range in inverse relation to the infinitely variable hydrostatic output speed on the first output shaft;
- third and fourth brakes actuated in concert by the transmission controller to respectively ground the commonly connected fifth, eighth and twelfth gear elements and third gear element, and thereby produce an infinitely variable output speed on the second output shaft in a first reverse transmission range in direct relation to the infinitely variable hydrostatic output speed on the first output shaft; and
- a second clutch actuated in concert with the fourth brake by the transmission controller to interconnect the twelfth gear element and the second gear element and to ground the third gear element, and thereby produce an infinitely variable output speed on the second output shaft in a second reverse transmission range in inverse relation to the infinitely variable hydrostatic output speed on the first output shaft.

20. The transmission defined in claim 19 wherein:

the transmission controller actuates the first and second clutches in concert to produce infinitely variable output speed on the second output shaft in a third forward speed range in direct relation to the infinitely variable hydrostatic output speed on the first output shaft; and the transmission controller actuates the second and fourth brakes in concert to produce infinitely variable output speed on the second output shaft in a third reverse range in direct relation to the infinitely variable hydrostatic output speed on the first output shaft.

21. The transmission defined in claim 20, wherein:

the first, second, and third gear elements are a sun gear, a planet gear carrier, and a ring gear, respectively, of the first planetary gear set;

the fourth, fifth, and sixth gear elements are a sun gear, a planet gear carrier, and a ring gear, respectively, of the second planetary gear set;

the seventh, eighth and ninth gear elements are a sun gear, a planet gear carrier, and a ring gear of the third planetary gear set; and the tenth, eleventh, and twelfth gear elements are a sun gear, a planet gear carrier, and a ring gear, respectively, of the fourth planetary gear set.

22. The transmission defined in claim 21, wherein the planet gear carrier of the first planetary gear set is a compound planet gear carrier.

23. The transmission defined in claim 20, wherein the hydrostatic power unit includes:

- a hydraulic pump unit driven by the first input shaft;
- a stationary hydraulic motor unit;
- a wedge-shaped swashplate operatively positioned to accommodate pumped exchanges of hydraulic fluid between the hydraulic pump and motor units through ports in the swashplate, the swashplate connected in torque-coupled relation with the first output shaft and adjustable about a pivot axis, intersecting the first output shaft in orthogonal relation, through a continuous range of swashplate angles; and
- a ratio controller operable by the transmission controller to pivot the swashplate through the range of swashplate angles and thereby stroke the hydraulic power unit through the 1:0 to 1:1 transmission ratio range.

* * * * *

UNITED STATES PATENT AND TRADEMARK OFFICE
CERTIFICATE OF CORRECTION

PATENT NO. : 5,730,678
DATED     : March 24, 1998
INVENTOR(S) : Robert Francis Larkin It is certified that error appears in the above-indentified patent and that said Letters Patent is hereby corrected as shown below:

Claim 1, col. 16, line 63, change "get" to --gear--;

col. 17, line 4, change "get" to --gear--.

Claim 12, col. 18, line 29, change "product" to --produce--.

Claim 18, col. 19, line 37, change "eight" to --eighth--.

Signed and Sealed this

Fourteenth Day of July, 1998

Attest:

BRUCE LEHMAN

*Attesting Officer*   *Commissioner of Patents and Trademarks*